(12) United States Patent
Swaminathan et al.

(10) Patent No.: US 9,615,131 B2
(45) Date of Patent: Apr. 4, 2017

(54) SYSTEM AND METHOD OF MOTION DETECTION ON ENCRYPTED OR SCRAMBLED VIDEO DATA STREAMS

(71) Applicant: Honeywell International Inc., Morristown, NJ (US)

(72) Inventors: Gurumurthy Swaminathan, Bangalore (IN); Yadhunandan U S, Tirupati (IN); Kwong Wing Au, Bloomington, MN (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 465 days.

(21) Appl. No.: 13/962,246

(22) Filed: Aug. 8, 2013

(65) Prior Publication Data

US 2015/0043733 A1 Feb. 12, 2015

(51) Int. Cl.
| | |
|---|---|
| *H04L 29/00* | (2006.01) |
| *H04N 9/00* | (2006.01) |
| *H04N 21/4405* | (2011.01) |
| *H04N 21/2347* | (2011.01) |
| *H04N 21/235* | (2011.01) |
| *H04N 19/513* | (2014.01) |

(Continued)

(52) U.S. Cl.
CPC ........... *H04N 21/4405* (2013.01); *H04L 9/36* (2013.01); *H04N 19/48* (2014.11); *H04N 19/513* (2014.11); *H04N 19/88* (2014.11); *H04N 21/235* (2013.01); *H04N 21/2347* (2013.01); *H04N 21/2351* (2013.01); *H04L 9/065* (2013.01); *H04L 2209/60* (2013.01); *H04N 5/144* (2013.01)

(58) Field of Classification Search
CPC ....... H04L 9/36; H04L 2209/60; H04L 9/062; H04N 21/235; H04N 21/4405; H04N 19/88; H04N 21/2347; H04N 21/2351; H04N 19/513; H04N 19/48; H04N 5/144
See application file for complete search history.

(56) References Cited

U.S. PATENT DOCUMENTS 6,094,234 A * 7/2000 Nonomura ............. H04N 19/00
348/700
6,359,560 B1 * 3/2002 Budge .............. G08B 13/19602
340/506

(Continued)

FOREIGN PATENT DOCUMENTS

| CN | 102395030 A | 3/2012 |
|---|---|---|
| EP | 2 782 340 A1 | 9/2014 |

OTHER PUBLICATIONS

Razib Iqbal et al., Compressed-domain Encryption of Adapted H.264 Video, Proceedings of the Eighth IEEE International Symposium on Multimedia, Dec. 1, 2006, pp. 979-984, San Diego, California, USA.

(Continued)

*Primary Examiner* — Michael Pyzocha
(74) *Attorney, Agent, or Firm* — Husch Blackwell LLP

(57) ABSTRACT

Systems and methods of motion detection on encrypted or scrambled video data streams are provided. Some methods can include identifying macroblock size information for an encrypted/scrambled video data stream and using the identified macroblock size information to determine a presence of motion in the encrypted/scrambled video data stream without decrypting and descrambling the encrypted/scrambled video data stream.

7 Claims, 5 Drawing Sheets

(51) Int. Cl.
*H04N 19/48* (2014.01)
*H04N 19/88* (2014.01)
*H04L 9/36* (2006.01)
*H04L 9/06* (2006.01)
*H04N 5/14* (2006.01)

(56) References Cited

U.S. PATENT DOCUMENTS

| | | | | |
|---|---|---|---|---|
| 2002/0106019 A1* | 8/2002 | Chaddha | ............... | H04N 19/51 375/240.02 |
| 2004/0114817 A1* | 6/2004 | Jayant | ............... | H04N 19/00 382/239 |
| 2004/0139336 A1* | 7/2004 | McLean | ............... | H04L 9/12 713/189 |
| 2005/0207569 A1 | 9/2005 | Zhang et al. | | |
| 2006/0171453 A1* | 8/2006 | Rohlfing | ............... | G08B 13/19632 375/240.01 |
| 2006/0187358 A1* | 8/2006 | Lienhart | ............... | G06F 17/30802 348/661 |
| 2006/0198441 A1* | 9/2006 | Chi | ............... | G06T 7/2013 375/240.16 |
| 2006/0257032 A1* | 11/2006 | Nakagawa | ............... | G06T 17/20 382/232 |
| 2006/0282665 A1* | 12/2006 | Zhu | ............... | H04N 7/1675 713/160 |
| 2008/0137667 A1* | 6/2008 | Mohandas | ............... | H04L 12/1868 370/395.64 |
| 2009/0041114 A1* | 2/2009 | Clark | ............... | H04L 43/0829 375/240.01 |
| 2009/0067626 A1* | 3/2009 | Dufaux | ............... | H04N 21/23476 380/217 |
| 2009/0168878 A1* | 7/2009 | Kawashima | ............... | H04N 19/503 375/240.13 |
| 2009/0168892 A1* | 7/2009 | McFarland | ............... | H04N 7/1675 375/240.24 |
| 2009/0204812 A1* | 8/2009 | Baker | ............... | H04L 65/607 713/160 |
| 2009/0252230 A1* | 10/2009 | Zhan | ............... | H04N 19/43 375/240.16 |
| 2011/0103771 A1* | 5/2011 | Choo | ............... | H04N 5/76 386/259 |
| 2012/0066281 A1* | 3/2012 | Strasman | ............... | H04N 21/64723 708/424 |
| 2012/0114040 A1* | 5/2012 | Shmueli | ............... | H04N 19/139 375/240.16 |
| 2012/0134496 A1* | 5/2012 | Farkash | ............... | H04N 7/167 380/210 |
| 2012/0328008 A1* | 12/2012 | Uchida | ............... | H04N 5/23254 375/240.03 |
| 2013/0343719 A1* | 12/2013 | Morin | ............... | H04N 19/46 386/239 |
| 2014/0233792 A1* | 8/2014 | Us | ............... | H04N 19/503 382/103 |
| 2015/0163493 A1* | 6/2015 | Huang | ............... | H04N 19/48 375/240.03 |

OTHER PUBLICATIONS

Changgui Shi et al., An efficient MPEG Video Encryption Algorithm, Reliable Distributed Systems, Proceedings Seventeeth IEEE Symposium, Oct. 20, 1998, pp. 381-386, Los Alamitos, California, USA.

Frederic Dufaux et al., Scrambling for Video Surveillance with Privacy, Computer Vision and Pattern Recognition Workshop, 2006 Conference, Jun. 17, 2006, pp. 160-166, Piscataway, New Jersey, USA.

Chris Poppe et al., Moving object detection in the H.264/AVC compressed domain for video surveillance applications, Journal of Visual Communication and Image Representation, Aug. 1, 2009, pp. 428-437, vol. 20, No. 6, Academic Press, Inc., USA.

Poppe et al., Moving Object Detection in the H.264/AVC Compressed Domain for Video Surveillance Applications, J. Vis. Commun. Image R. 20 (2009) 428-437.

Vacavant et al., Adaptive Background Subtraction in H.264/AVC Bitstreams Based on Macroblock Sizes, VISAPP 2011—International Conference on Computer Vision Theory and Applications, pp. 51-58.

Stutz et al., A Survey of H.264 AVC/SVC Encryption, IEEE Transactions on Circuits and Systems for Video Technology, vol. 22, No. 3, Mar. 2012, pp. 325-339.

\* cited by examiner

SYSTEM AND METHOD OF MOTION DETECTION ON ENCRYPTED OR SCRAMBLED VIDEO DATA STREAMS

FIELD

The present invention relates generally to motion detection. More particularly, the present invention relates to systems and methods of motion detection on encrypted or scrambled video data streams.

BACKGROUND

The use of cloud technology for storing and archiving video surveillance data and other video data streams has become prevalent. In this regard, when the video surveillance data is stored on a cloud network, security and access to the data becomes a very important issue. To enhance security, data stored on a cloud network is often encrypted to prevent unauthorized data access; authorized access can be provided to a user who generates the data.

Unfortunately, it is often difficult to perform video analytics, such as motion detection, on encrypted data. For example, in known systems and methods, when a cloud service provider stores video data streams based on motion information, the raw, unencrypted video data streams must be processed through a motion detection algorithm, and the output of the motion detection algorithm is used to store key interest data and to send alerts to a customer or other user. The motion detection algorithm is typically executed and run by the cloud service provider. Accordingly, the service provider must have access to the decrypted data stream, increasing the chance of unauthorized data access.

In view of the above, there is a continuing, ongoing need for systems and methods of motion detection on encrypted or scrambled video data streams.

DETAILED DESCRIPTION

Figure 1:
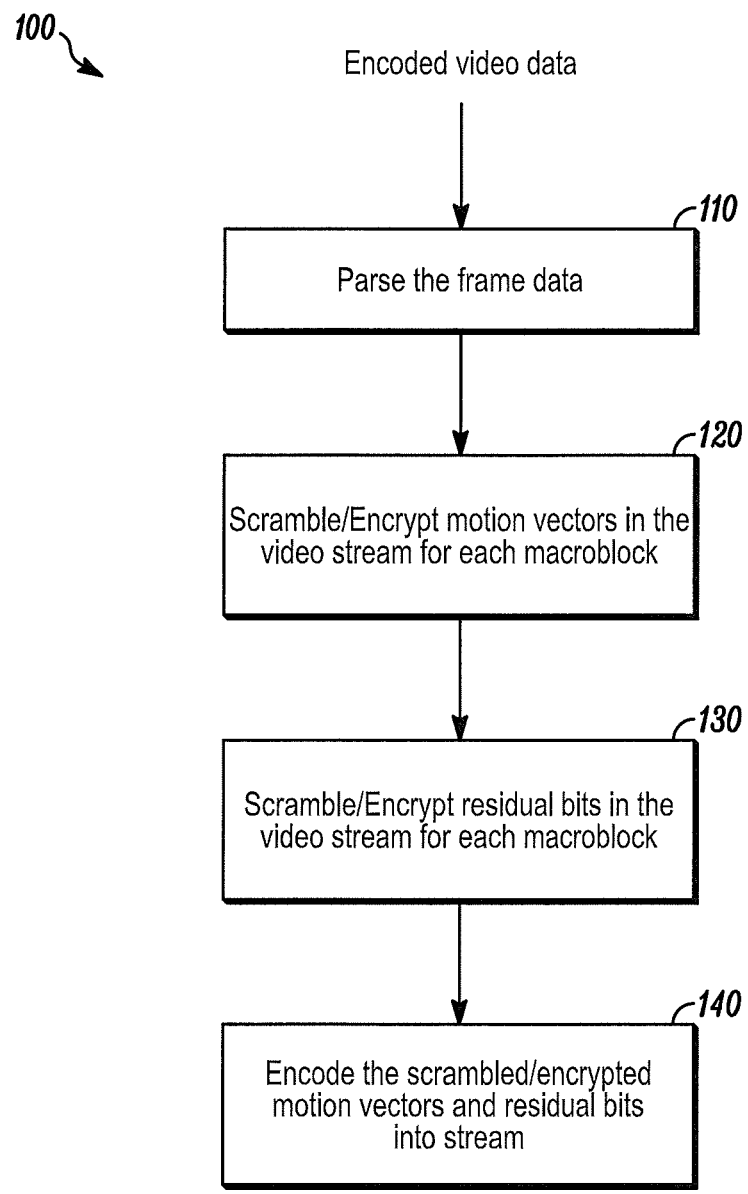
FIG. 1 is a flow diagram of a method of encrypting a video data stream in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include systems and methods of motion detection on encrypted or scrambled video data streams. When video analytics, such as motion detection, is executed and run on encrypted data as opposed to decrypted data, security is increased because access to the decrypted data can be denied to unauthorized users, such as cloud service providers. That is, access to the decrypted data can be granted only to authorized users, such as a customer or other user, for example, a user who generates the data.

Although not limiting, it is to be understood that some systems and methods disclosed herein can employ some or all of the system and method for detecting motion in compressed video disclosed in U.S. application Ser. No. 13/772,012, filed Feb. 20, 2013. U.S. application Ser. No. 13/772,012 is assigned to the assignee hereof and is hereby incorporated by reference.

In some embodiments disclosed herein, motion in an encrypted or scrambled video data stream can be detected by constraining the video data stream so that it is at least partially parsable and so that the size of each macroblock in the video data stream doesn't change. That is, the macroblock size can remain the same before and after encryption or scrambling. Then, motion detection can be executed using the macroblock size information.

For example, macroblock size information can be obtained by parsing an encrypted or scrambled video data stream without analyzing the content of the data stream. When motion detection requires only macroblock size information, the remainder of the data stream, including motion vectors, residual DCT coefficients, Quantization factors, residual data, and the like, can be encrypted or scrambled during storage and/or transmission of the video data stream and need not be decrypted or descrambled to detect motion in the video data stream. Accordingly, video data streams can be stored as encrypted data on a remote storage device, such as a cloud network, and video analytics can be executed and run on the encrypted video data streams for detecting motion and/or for motion-based storage.

In accordance with the above, compressed motion detection can depend fully, mostly, or in part on macroblock size information. Other data stream information, including motion vectors, residual DCT coefficients, Quantization factors, residual bits, and the like, can be encrypted or scrambled to hide video content. Accordingly, decoded video that has not been decrypted will be unclear and cannot be used for unauthorized purposes.

In accordance with disclosed embodiments, video data streams can be encoded using any video coding method as would be known by those of skill in the art, including, but not limited to H.264, H.265, MPEG-2,4, and the like. Then, the video data streams can be encrypted by (1) encrypting and/or scrambling residual DCT coefficients, (2) changing the order and/or linearizing the size of the residual DCT coefficients, (3) scrambling the motion vectors of the macroblocks in the video data stream, (4) scrambling the residual DCT coefficients, and/or (5) scrambling and/or changing the coding mode of each macroblock in the video data stream. Each of these encryption methods can ensure secrecy of the data without changing the size of the macroblocks in the video data stream. Accordingly, the encrypted video data stream can remain parsable by a decoder that is compatible with the video coding method used to encode the raw video data stream.

In some embodiments, an encrypted video data stream can be stored on a remote storage device, such as a cloud network. Then, motion can be detected in the encrypted video data stream by parsing the encrypted video data stream and measuring the size of each macroblock in every frame of the encrypted video data stream. The size of each macroblock can then be validated by comparing macroblock sizes with a ratio threshold and/or a bit threshold for the presence of motion. Accordingly, the encrypted video data stream need not be decrypted and/or descrambled to detect motion in the video data stream.

In some embodiments disclosed herein, an entire video data stream can be encrypted or scrambled without constraints as would be known by those of ordinary skill in the art. Furthermore, a data string can be attached to, appended to, and/or associated with the encrypted or scrambled video data stream such that the data string contains the size information of the macroblock for each frame of the video data stream. In these embodiments, both the encrypted video data stream and the data string containing the macroblock size information can be remotely stored, for example, on a cloud network. Then, video analytics can be executed and run using only the macroblock size information contained in the data string. Accordingly, motion detection can be executed without decrypting or descrambling the video data stream.

In accordance with the above, compressed motion detection can depend fully, mostly, or in part on macroblock size information. When the entire video data stream is encrypted, the encrypted video data stream can be accompanied by the data string that contains the size information of the macroblock for every frame in the video data stream. Then, motion detection can be executed using the macroblock size information that is stored with the encrypted video data stream, but without decrypting the video data stream itself.

In accordance with disclosed embodiments, video data streams can be encoded using any video coding method as would be known by those of skill in the art, including, but not limited to H.264, H.265, MPEG-2,4, and the like. Then, the video data streams can be parsed to compute the size of each macroblock in every frame of the video data stream, and the macroblock size information can be stored in a data string.

After the macroblock size information is stored in the data string, the video data streams can be encrypted using any encryption method as would be known by those of skill in the art. The encrypted video data stream and the data string with the macroblock size information can be stored on a remote storage device, such as a cloud network. In some embodiments, the encrypted video data stream and the data string with the macroblock size information for the encrypted video data stream can be stored together and/or associated with one another on the cloud network. However, in accordance with disclosed embodiments, the data string can be accessed independently from the encrypted video data stream.

Motion can be detected in the encrypted video data stream by parsing the data string to obtain the size information for each macroblock. The size information for each macroblock can then be validated by comparing the macroblock size information with a ratio threshold and/or a bit threshold for the presence of motion. Accordingly, the encrypted video data stream need not be decrypted and/or descrambled to detect motion in the video data stream.

As explained above, the presence of motion in each macroblock of a video data stream can be computed and/or detected by comparing the macroblock size information with at least two different thresholds. For example, the ratio of the size of a current macroblock with the same macroblock in two adjacent i-frames—for example, immediate past and future frames—can be computed. In some embodiments, if the ratio is greater than a ratio threshold, then the macroblock can be analyzed further for confirmation of the presence of motion. For example, the size of the current macroblock can be directly compared to a bit threshold, and the bit threshold can be computed using the average macroblock size in the current frame of the video data stream. In some embodiments, if the macroblock size is greater than the bit threshold, then systems and methods disclosed herein can determine that motion is detected in the macroblock.

FIG. 1 is a flow diagram of a method 100 of encrypting a video data stream in accordance with one disclosed embodiment. As seen in FIG. 1, a video data stream that has been encoded using methods known by those of skill in the art, including, but not limited to H.264, H.265, MPEG-2,4, and the like, can be input into the method 100. The method 100 can include parsing the frame data of the video data stream as in 110. Then, the method 100 can include encrypting and/or scrambling motion vectors in the video data stream for each macroblock of the video data stream as in 120 and encrypting and/or scrambling residual bits in the video data stream for each macroblock in the video data stream as in 130. The method 100 can also include encoding the encrypted and/or scrambled motion vectors and residual bits into a video data stream as in 140. For example, the encrypted and/or scrambled motion vectors and residual bits can be encoded into a video data stream using methods known by those of skill in the art, including, but not limited to H.264, H.265, MPEG-2,4, and the like.

Figure 2:
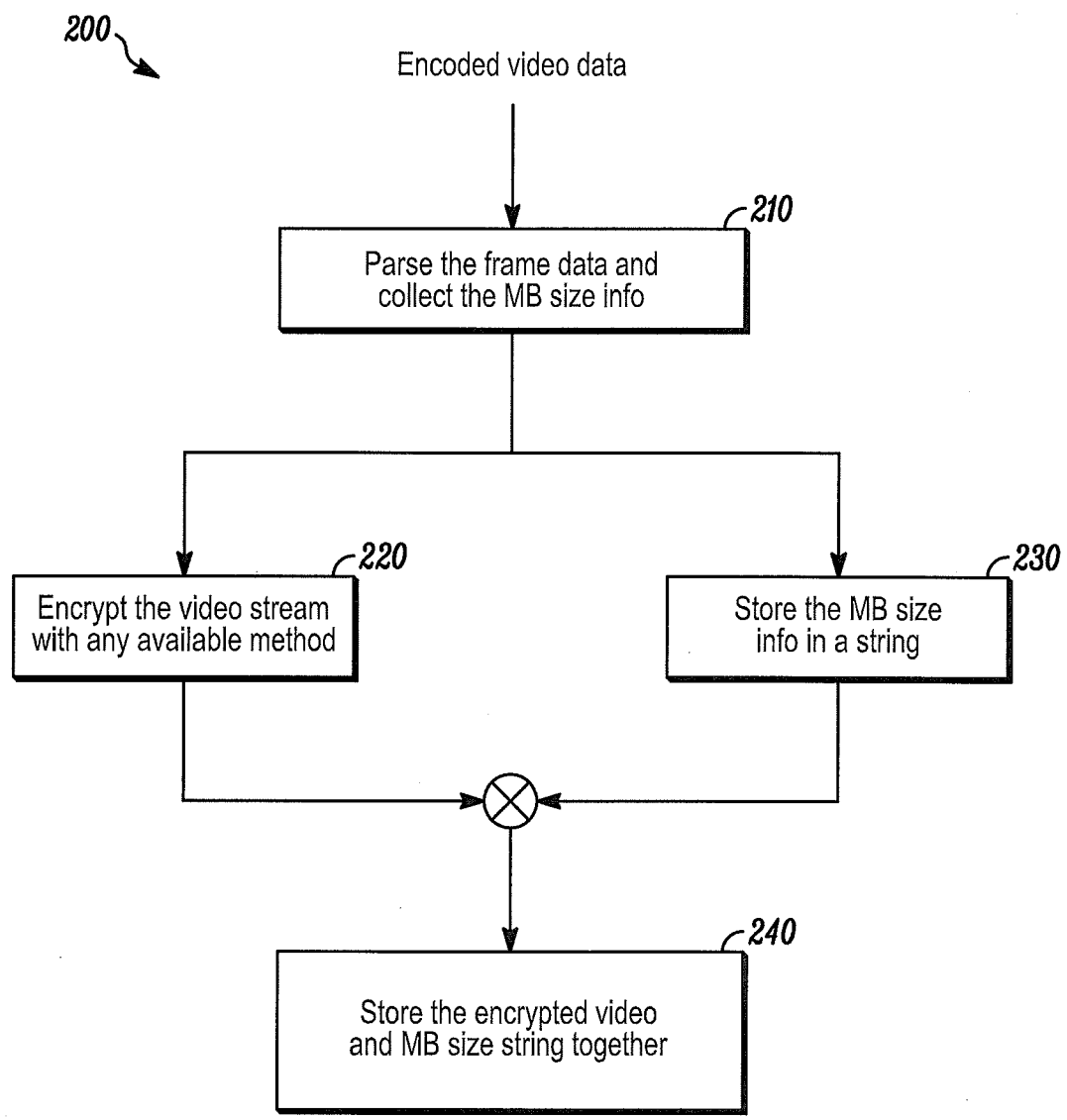
FIG. 2 is a flow diagram of a method of encrypting a video data stream in accordance with disclosed embodiments.

FIG. 2 is a flow diagram of a method 200 of encrypting a video data stream in accordance with one disclosed embodiment. As seen in FIG. 2, a video data stream that has been encoded using methods known by those of skill in the art, including, but not limited to H.264, H.265, MPEG-2,4, and the like, can be input into the method 200. The method 200 can include parsing the frame data of the video data stream and collecting the macroblock size information as in 210. Then, the method 200 can include encrypting the video data stream with any encryption method as would be known by those of skill in the art as in 220 and storing the collected macroblock size information in a data string as in 230. The method 200 can also include storing the encrypted video data stream and the data string with the macroblock size information as in 240. For example, in some embodiments, the encrypted video data stream can be stored together with the data string, and in some embodiments, the stored encrypted video data stream can be associated with the stored data string.

Figure 3:
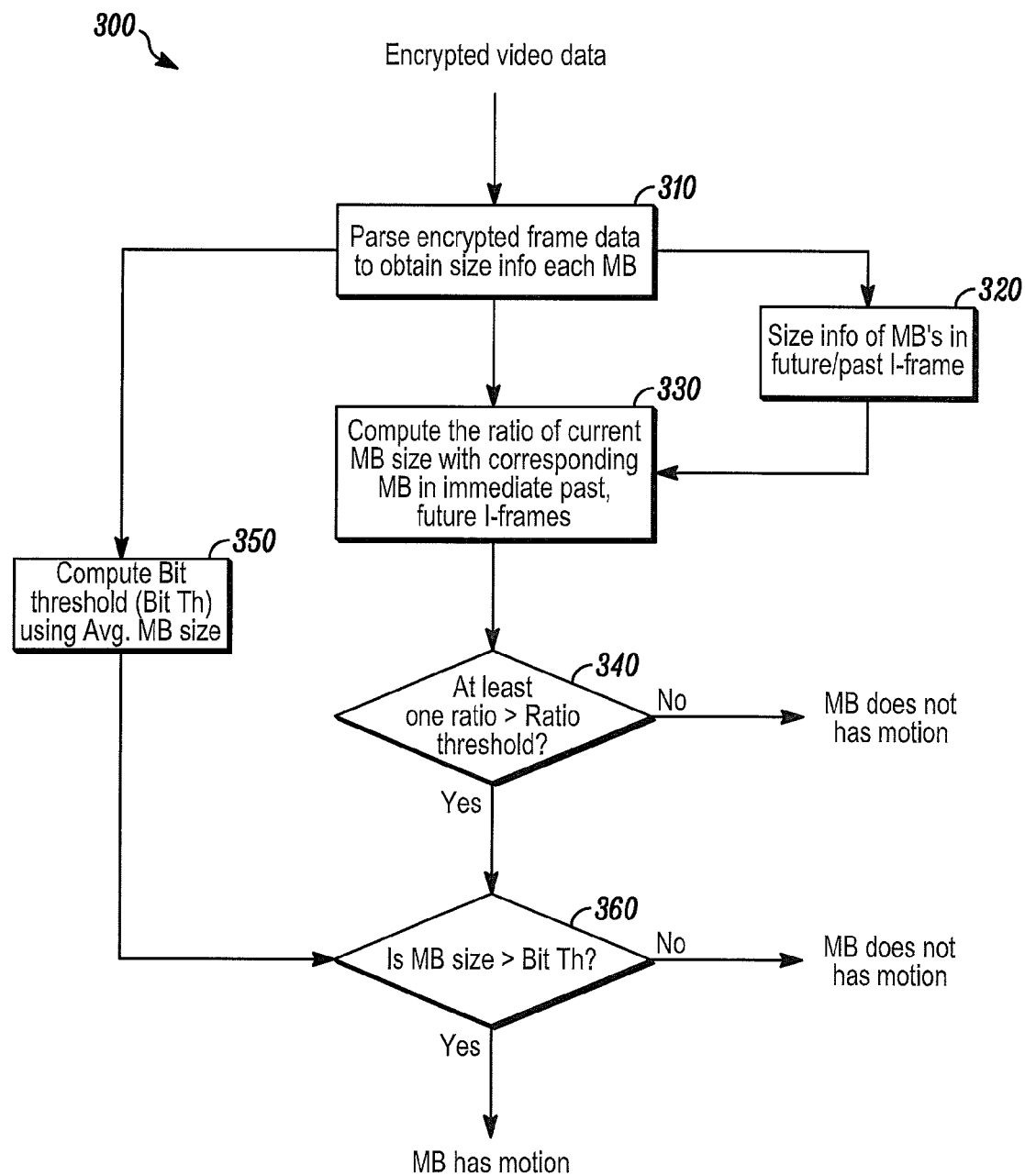
FIG. 3 is a flow diagram of a method of detecting motion in accordance with disclosed embodiments.

FIG. 3 is a flow diagram of a method 300 of detecting motion in accordance with one disclosed embodiment. As seen in FIG. 3, an encrypted video data stream that has also been encoded using methods known by those of skill in the art, including, but not limited to H.264, H.265, MPEG-2,4, and the like, can be input into the method 300. The method 300 can include parsing encrypted frame data of the encrypted video data stream to obtain size information for each macroblock in the encrypted video data stream as in 310. The method 300 can also include computing the macroblock size information of immediate past and future i-frames as in 320, wherein the past and future i-frames are relative to a current macroblock whose size information was obtained as in 310.

As seen in FIG. 3, the method 300 can include computing the ratio of size information for a current macroblock, as obtained in 310, with size information for the macroblocks in the immediate past and future i-frames, as obtained in 320, as in 330. Then, the method 300 can determine whether the ratio computed as in 330 is greater than a predetermined ratio threshold as in 340. If not, then the method 300 can determine that the current macroblock does not include motion.

However, if the method 300 determines that the ratio computed as in 330 is greater than the predetermined ratio threshold as in 340, then the method 300 can determine whether the size information for the current macroblock, as obtained in 310, is greater than a predetermined bit threshold as in 360. For example, as seen in FIG. 3, the method 300 can compute the bit threshold using the average size of macroblocks in the encrypted video data stream as in 350.

If the method 300 determines that the size information for the current macroblock is not greater than the predetermined bit threshold as in 360, then the method 300 can determine that the current macroblock does not include motion. However, if the method 300 determines that the size information for the current macroblock is greater than the predetermined bit threshold as in 360, then the method 300 can determine that motion is detected in the current macroblock.

Figure 4:
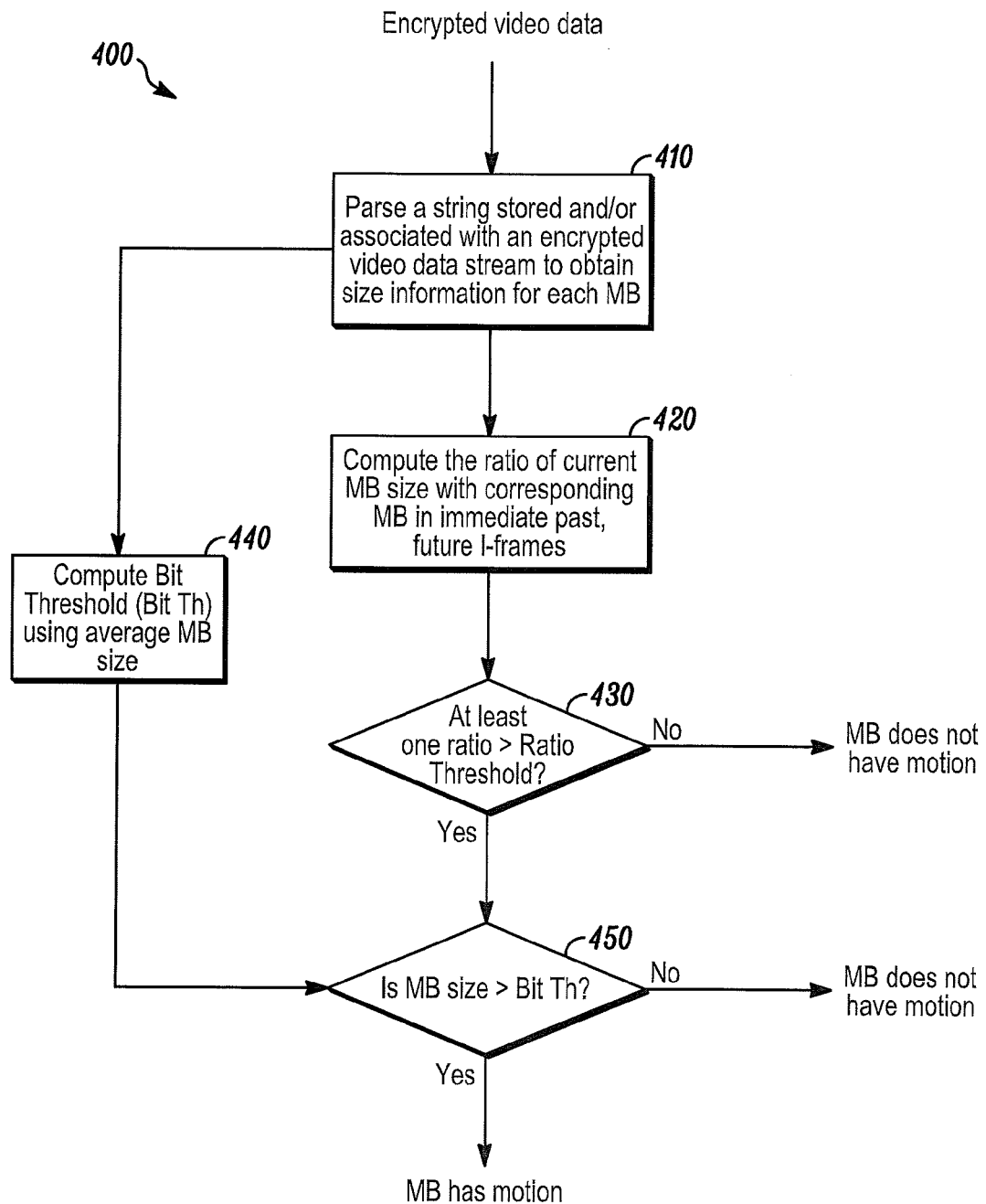
FIG. 4 is a flow diagram of a method of detecting motion in accordance with disclosed embodiments.

FIG. 4 is a flow diagram of a method 400 of detecting motion in accordance with one disclosed embodiment. As seen in FIG. 4, an encrypted video data stream that has also been encoded using methods known by those of skill in the art, including, but not limited to H.264, H.265, MPEG-2,4, and the like, can be input into the method 400. The method 400 can include parsing a data string stored and/or associated with the encrypted video data stream to obtain size information for each macroblock in the encrypted video data stream as in 410. For example, the data string can include the size information for each macroblock in the encrypted video data stream.

As seen in FIG. 4, the method 400 can include computing the ratio of size information for a current macroblock with size information for immediate past and future macroblocks as in 420. In some embodiments, the size information for the current, past, and future macroblocks can be obtained from the data string that was stored and/or associated with the encrypted video data stream. Then, the method 400 can determine whether the ratio computed as in 420 is greater than a predetermined ratio threshold as in 430. If not, then the method 400, can determine that the current macroblock does not include motion.

However, if the method 400 determines that the ratio computed as in 420 is greater than the predetermined ratio threshold as in 430, then the method 400 can determine whether the size information for the current macroblock is greater than a predetermined bit threshold as 450. For example, as seen in FIG. 4, the method 400 can compute the bit threshold using the average size for each macroblock obtained from the data string as in 440.

If the method 400 determines that the size information for the current macroblock is not greater than the predetermined bit threshold as in 450, then the method 400 can determine that the current macroblock does not include motion. However, if the method 400 determines that the size information for the current macroblock is greater than the predetermined bit threshold as in 450, then the method 400 can determine that motion is detected in the current macroblock.

Figure 5:
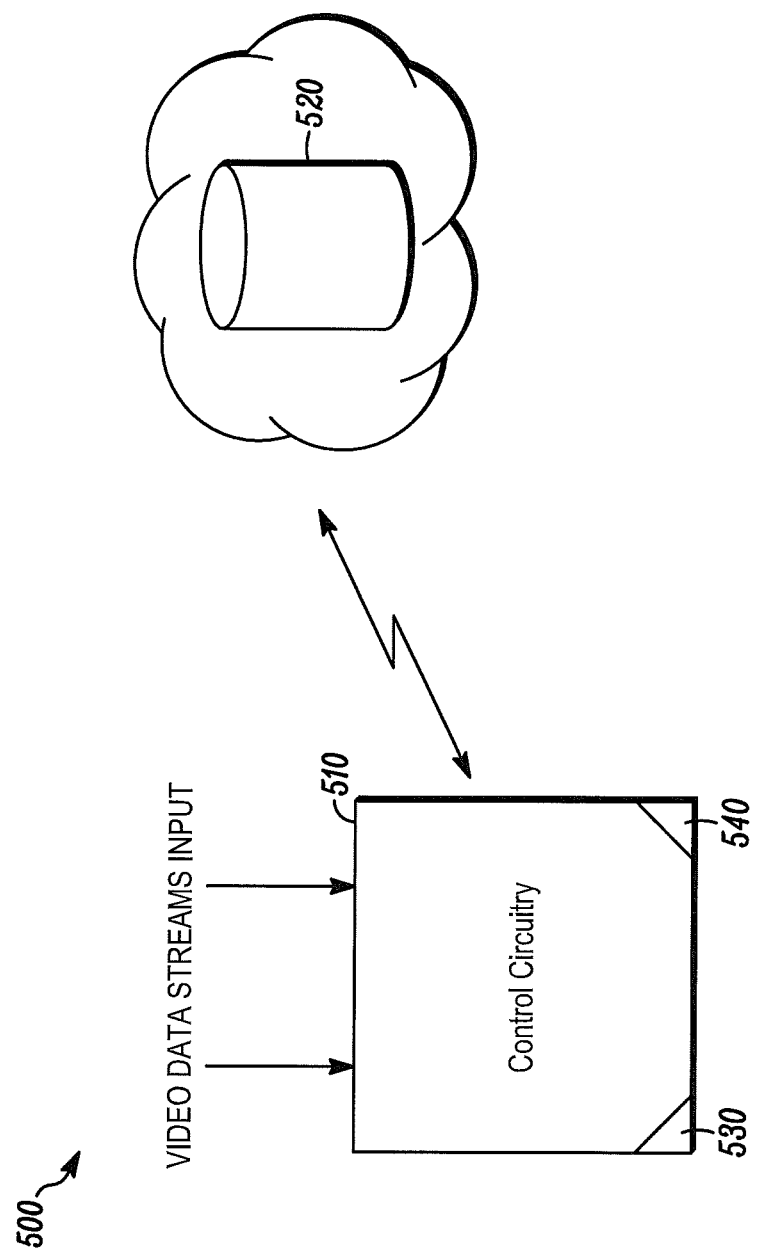
FIG. 5 is a block diagram of a system for executing the methods of FIGS. 1-4 and others in accordance with disclosed embodiments.

FIG. 5 is a block diagram of a system 500 for executing the methods of FIGS. 1-4 and others in accordance with disclosed embodiments. As seen in FIG. 5, the system 500 can include control circuitry 510 that receives video data streams and that is in bidirectional communication with a remote storage device 520, such as a cloud network.

The control circuitry 510 can include one or more programmable processors 530 and executable control software 540 stored on a transitory or non-transitory computer readable medium, including, but not limited to computer memory, RAM, optical storage media, magnetic storage media, flash memory, and the like. In some embodiments, the programmable processors 530 and the executable control software 540 can implement some or all of the steps of methods 100, 200, 300, and 400 shown in FIGS. 1-4 as well as others disclosed herein.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the sprit and scope of the invention.

What is claimed is:

1. A method comprising:
   identifying macroblock size information for each frame of an encrypted/scrambled video data stream;
   storing the macroblock size information for each frame of the encrypted/scrambled video data stream into a data string, wherein the data string includes the macroblock size information for each frame of the encrypted/scrambled video data stream without analyzing content of the encrypted/scrambled video data stream;
   attaching or appending the encrypted/scrambled video data stream to the data string; and
   determining a presence of motion in the encrypted/scrambled video data stream without decrypting and descrambling the encrypted/scrambled video data stream by running video analytics only on the macroblock size information contained within the data string,
   wherein running the video analytics on the macroblock size information to determine the presence of motion in the encrypted/scrambled video data stream includes comparing the macroblock size information contained in the data string with a bit threshold, and
   wherein the bit threshold is computed by calculating an average macroblock size for all macroblocks included in the data string.

2. The method of claim 1 wherein identifying the macroblock size information for each frame of the encrypted/scrambled video data stream includes parsing the encrypted/scrambled video data stream without analyzing the content of the encrypted/scrambled video data stream.

3. The method of claim 2 further comprising measuring a size of each macroblock in each frame of the encrypted/scrambled video data stream.

4. The method of claim 1 further comprising storing the encrypted/scrambled video data stream and the data string on a remote storage device.

5. The method of claim 4 further comprising accessing the data string independently from the encrypted/scrambled video data stream.

6. The method of claim 1 wherein running the video analytics on the macroblock size information to determine the presence of motion in the encrypted/scrambled video data stream includes bypassing decryption and descrambling of at least one of motion vectors, residual DCT coefficients, Quantization factors, and residual data of the encrypted/scrambled video data stream and determining the presence of motion using the macroblock size information for the encrypted/scrambled video data stream.

7. The method of claim 1 wherein comparing the macroblock size information includes comparing the macroblock size information with a second threshold, and wherein the second threshold includes a second ratio threshold, a second bit threshold, or a second predetermined threshold suitable for determining whether a macroblock includes motion.

* * * * *